United States Patent [19]
Tudberry

[11] 3,760,506
[45] Sept. 25, 1973

[54] CARD GAUGE

[75] Inventor: Ronald Owen Tudberry, Knebworth, England

[73] Assignee: International Computers Limited, London, England

[22] Filed: Nov. 19, 1971

[21] Appl. No.: 200,361

[30] Foreign Application Priority Data
Mar. 26, 1971 Great Britain...................... 8,723/71

[52] U.S. Cl.................. 33/174 R, 33/1 BB, 73/156
[51] Int. Cl. .............................................. G01b 5/16
[58] Field of Search............................ 73/156, 157; 33/174 K; 356/71, 168, 171

[56] References Cited
UNITED STATES PATENTS
3,344,529  10/1967  Brown............................. 73/156 X
2,571,188  10/1951  Benson .......................... 356/168 X FOREIGN PATENTS OR APPLICATIONS
217,861  4/1909  Germany.......................... 33/174 K
7,653  2/1905  Great Britain.................... 33/174 K
389,756  3/1933  Great Britain.................... 33/174 K Primary Examiner—Richard C. Queisser
Assistant Examiner—Joseph W. Roskos
Attorney—Keith Misegades et al.

[57] ABSTRACT

A punched card gauge has at each possible hole position marks defining at least two boundaries one within the other. Sight of the inner boundary but none of the outer one is required on making a hole sight of the whole of the inner boundary indicates a hole is satisfactory for sensing.

4 Claims, 3 Drawing Figures

PATENTED SEP 25 1973　　　　　　　　　　　　　　　　3,760,506

CARD GAUGE

BACKGROUND OF THE INVENTON

The invention relates to a gauge for cards that have a plurality of possible positions for information representative holes.

As currently used for information storage such cards, commonly known as punch cards, have a plurality of rows and columns of possible hole positions. Information is stored by punching holes at appropriate positions. Reading the information can be done using a sensing wire block. There are certain tolerances allowed in the manufacture of the card and in the punch apparatus and sensing apparatus. These tolerances, of course, are intended to correspond, even in their most unfavourable combination, with acceptable variations of position and/or size of punched holes. However, conditions of storage can cause changes of size in a card, which is usally made of organic material. Before deciding on adjustment of sensing apparatus after unsuccessful sensing of a card, it is therefore useful to be able to check that the card and its holes are within requirements regarding size and position.

A card gauge is used for such a check. Generally, a gauge applies a single standard. However, it is possible to estimate the extent to which a card will change under any particular envisaged circumstances, or at least to decide what degree of change it is possible to allow for between punching time and sensing time.

SUMMARY OF INVENTION

The invention aims to provide a card gauge by which a different standard can be applied to cards when punched from that applied when sensing. While such a difference cannot guarantee that a card considered satisfactory on punching will also be satisfactory for reading after size change, it can serve in excluding a number of cards that have a high probability of being unsatisfactory for sensing after a change of size.

According to the invention there is provided a gauge for a card having a plurality of possible positions for information representative holes, comprising a member having a surface including a portion that corresponds with a standard card size and has, at each of a plurality of positions each corresponding to a possible hole, marks defining a first closed boundary and a second closed boundary wholly within the first, so that, for a said card having a corner in register with a corresponding corner of said portion, sight through each hole therein of a) the second boundary but none of the first boundary should be had on making of that hole, and b) at least the whole of the second boundary should be had for satisfactory sensing of that hole.

Preferably, the marks at each position further include between the first and second boundaries a third closed boundary at least part of which should be visible with said first boundary on said making of that hole.

The marks may define said boundaries by transitions of appearance of the surface.

The surface of the gauge may have projections, preferably, though not necessarily, of integral form, on two adjacent edges of said portion to locate a rectangular said card. Further marks may define an L-shape on which the edge of a card of acceptable size should overlap.

BRIEF DESCRIPTION OF DRAWING:

One embodiment of card gauge embodying the invention will now be described by way of example, with reference to the accompanying drawing, in which.

DESCRIPTION OF PREFERRED EMBODIMENT:

A gauge is shown which comprises a metal plate 10 having a surface portion corresponding to a standard size of punch card. This portion is rectangular and has an L-shape 11—11 mark along two edges and raised portions 12 having their inner edges along the other two edges of the rectangular portion. The raised portions are accurately stamped and preferably have their inner edges coined to provide accurate location for a rectangular punch card.

Figure 1:
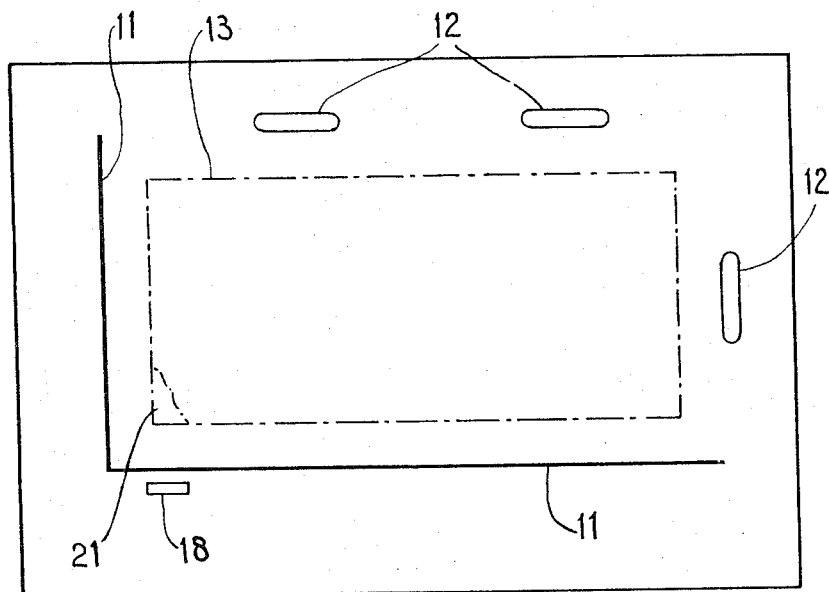
FIG. 1 is a plan schematic view.
Figure 2:
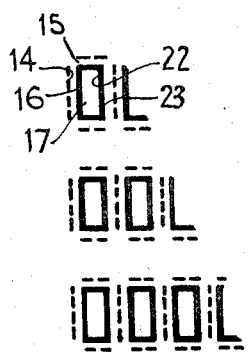
FIG. 2 shows a detail and
FIG. 3 shows another detail.

A central part 13 of this surface portion of the plate 10 corresponds with the positions at which a standard size punch card could be punched. FIG. 2 shows in detail the marks made at positions within the corner 21 of the central part 13 Corresponding to possible rectangular punched holes in a superposed card.

At each such positions marks are made to define, by changes of appearance of the surface of the plate 10, a first rectangular boundary along the inner edges of dashes 14 in a rectangle. Within the first boundary is a second rectangular boundary 22 uniformly separated from the first boundary by the consecutive spaces 15 and 16. Between these boundaries a third rectangular boundary 23 is uniformly separated from the first and second boundaries by the spaces 15 and 16, respectively. The rectangular area 17 inside the second boundary and the space 15 between the first and third boundaries are left unmarked whereas the space 16, (i.e. between second and third boundaries 22 and 23), and the dashes 14 are solidly marked, e.g. imprinted in black.

In use, a card is positioned on the plate 10 with its upper and right most sides against the raised portions 12. To be suitable for sensing or reading, the second boundary should be visible at each hole. In practice, this means the whole of area 17 together with at least part of the space 16.

Immediately after punching, however, the whole of the second boundary, part of the third boundary but none of the first boundary should be visible at each hole. In practice, this means that the whole of area 17 but none of the dashes 14 should be visible. If this is so, there is an improved probability that even after shrinkage while it is stored, a punched card will be suitable for reading. This is because, if a hole showed any part of the right most dashes 14, any shrinkage would cause the third boundary to be covered at the left side. Similar considerations regarding the left most dashes 14 and the right most part of the third boundary apply for expansion of a card, e.g. if damp. Such considerations apply equally to perpendicular dimensions of a card.

Bearing in mind that a punched hole is not required to be central of the marks, it is possible to consider the space 16 as a tolerance area for reading and the space 15 as a further tolerance area for punching. Preferably, an enlarged specimen hole position marking is made on the plate 10 at a suitable position with those tolerance areas labelled.

Figure 3:
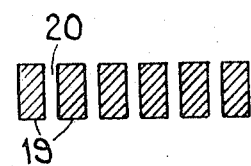

A further requirement of punch cards is that any two adjacent punched holes, should be separated by a minimum width of card. A suitable scale for this may be marked or the plate 10, e.g. at position 18, and may comprise, as shown enlarged in FIG. 3, solid contrasting blocks 19 separated by spaces 20 corresponding to the minimum width. Six adjacent blocks 19 are adequate for general application to 12-row, 80-column cards.

The lines 11 have a predetermined thickness so that, with a card accurately positioned against the stop portions 12, a card that is oversize in either dimension at any position will totally obscure the line 11 at the position, whereas an undersize card will not reach the inner boundary of the line 11 at the position of undersize. A correctly sized card will have two edges within the lines 11 along their entire length.

The marks on the plate 10, may be made in any suitable manner e.g. photo-etching and the stop portions 12 may be formed in any desired way.

I claim:

1. A card gauge for providing a first check of punched hole positions in a punch card immediately after the holes have been punched and, after an interval of time, a second check of the hole positions immediately prior to sensing the holes, including a member having a flat surface; locating projections engageable with adjacent edges of a card to be checked to locate a predetermined corner of the card to bring said card into a predetermined checking position with respect to the surface; a plurality of indicia positioned on the surface respectively to correspond to those positions on the card in which holes may be punched, the indicia at each position including first, second and third rectangular boundaries, the second boundary lying within and spaced from the first boundary and the third boundary lying between the first and second boundaries and respectively spaced therefrom such that when said first check is performed on an acceptable card there is visible through each punched hole the entire second boundary, at least a part of the third boundary and none of the first boundary, and when said second check is performed on an acceptable card there is visible through each hole the second boundary and none of the third and first boundaries.

2. A gauge as claimed in claim 1 wherein said flat surface is of metal and said indicia are photo-etched into said surface.

3. A gauge as claimed in claim 1 wherein said surface includes indicia representing linear strips of predetermined width positioned relative to said locating projections to correspond with further edges, one opposite each of said adjacent edges of a located card, said further edges of an acceptable located card lying within the width of said strips.

4. A gauge as claimed in claim 1 wherein said surface includes further indicia aligned in a row and spaced apart in adjacent columns respectively, the spacing between the indicia of the row corresponding to the minimum distance between adjacent punched holes in an acceptable card.

* * * * *